United States Patent
Kuroda et al.

(10) Patent No.: US 9,969,237 B2
(45) Date of Patent: May 15, 2018

(54) METHOD FOR PRODUCING STABILIZER AND HEATING DEVICE

(71) Applicant: NHK SPRING CO., LTD., Yokohama-shi, Kanagawa (JP)

(72) Inventors: Shigeru Kuroda, Yokohama (JP); Shuji Ohmura, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 711 days.

(21) Appl. No.: 14/408,157

(22) PCT Filed: May 24, 2013

(86) PCT No.: PCT/JP2013/064500
§ 371 (c)(1),
(2) Date: Dec. 15, 2014

(87) PCT Pub. No.: WO2013/187213
PCT Pub. Date: Dec. 19, 2013

(65) Prior Publication Data
US 2015/0174983 A1 Jun. 25, 2015

(30) Foreign Application Priority Data
Jun. 15, 2012 (JP) .................................. 2012-136181

(51) Int. Cl.
*B60G 21/055* (2006.01)
*C21D 1/40* (2006.01)
(Continued)

(52) U.S. Cl.
CPC ............. *B60G 21/055* (2013.01); *C21D 1/40* (2013.01); *C21D 9/0068* (2013.01); *C21D 9/08* (2013.01);
(Continued)

(58) Field of Classification Search
CPC ........ H05B 3/023; B60G 21/055; C21D 1/40; C21D 9/08
See application file for complete search history.

(56) References Cited

U.S. PATENT DOCUMENTS

| | | |
|---|---|---|
| 6,196,530 B1 | 3/2001 | Muhr et al. |
| 2007/0000916 A1 | 1/2007 | Tanaka et al. |
| 2012/0306136 A1 | 12/2012 | Kuroda et al. |

FOREIGN PATENT DOCUMENTS

| | | |
|---|---|---|
| JP | S5845130 U1 | 3/1983 |
| JP | S6164817 A | 4/1986 |

(Continued)

OTHER PUBLICATIONS

English Translation of Kuroda et al. (JP 2011-168101) (Sep. 1, 2011).*

(Continued)

*Primary Examiner* — Jessee Roe
(74) *Attorney, Agent, or Firm* — Oliff PLC

(57) ABSTRACT

A method for producing a stabilizer and a heating device allows the entirety of a hollow member to be uniformly heated to a temperature necessary for heat treatment, even in a case in which a cross section varying hollow member is used as the starting material. In a preliminary heating process, energizing heating is performed between electrodes, which are arranged at cross section varying parts at both ends of large cross sectional area part, which can be heated. In an entire heating process, by performing energizing heating between electrodes, which are arranged at both ends of the cross section varying hollow member, the latter can be heated. In the preliminary heating process, it is desirable to perform energization heating at a part having a cross sectional area ratio of 90% or more with respect to the part having a large cross sectional area in the cross section varying part.

5 Claims, 5 Drawing Sheets

(51) Int. Cl.
C21D 9/00 (2006.01)
C21D 9/08 (2006.01)
H05B 3/02 (2006.01)

(52) U.S. Cl.
CPC ....... *H05B 3/023* (2013.01); *B60G 2206/427* (2013.01); *B60G 2206/80* (2013.01)

(56) References Cited

FOREIGN PATENT DOCUMENTS

| | | |
|---|---|---|
| JP | S6221642 A | 1/1987 |
| JP | 3350446 B2 | 11/2002 |
| JP | 2004193033 A | 7/2004 |
| JP | 2011168101 A | 9/2011 |
| WO | 2005107324 A1 | 11/2005 |

OTHER PUBLICATIONS

Jul. 9, 2013 International Search Report issued in International Application No. PCT/JP2013/064500.

* cited by examiner

METHOD FOR PRODUCING STABILIZER AND HEATING DEVICE

TECHNICAL FIELD

The present invention relates to a method for producing a stabilizer that is constructed of a hollow member having a portion in which a cross sectional area thereof varies along the central axis, and relates to a heating device, and in particular, relates to improvements in heating techniques for heating treatment.

BACKGROUND ART

A stabilizer that is used for vehicles such as automobiles is a device for maintaining roll rigidity of the vehicles. FIG. 1 is a perspective view showing a construction of a stabilizer that is connected to a suspension device of a car. The stabilizer 10 includes a torsion part 11, an arm part 12, and a shoulder part 13, for example, and is formed approximately in the shape of the letter U. In the stabilizer 10, the torsion part 11 is attached to a car body (not shown) via bushes 3, and top portions of the arm part 12 are connected to the suspension devices 1 via stabilizer links 2. It should be noted that a tire (not shown) is attached to each of the axle parts 1A located at the left and right of the suspension devices 1.

In order to reduce the weight of the stabilizer, a hollow member such as a hollow pipe is used as a starting material. As the hollow member, a straight hollow member having constant outer diameter and inner diameter is generally used; however, in order to reduce weight further, a cross-section varying hollow member is suggested, which includes a portion at which diameter of the material varies along the central axis (for example, see Japanese Utility Model Publication No. Sho58 (1983)-45130, Japanese Examined Patent Publication No. Sho62 (1987)-21642, Japanese Patent No. 3350446.

In the above three documents, since the member includes a portion at which the diameter of the material varies along the central axis, it is difficult to produce and the production cost thereof is high. However, the Applicant of the present invention suggested limiting the cross sectional area of the material to two types to solve the problem (see Japanese Unexamined Patent Application Publication No. 2011-168101).

In the production of the stabilizer that includes the cross-section varying hollow member, the torsion part, arm part, and shoulder part are formed by performing a bending processing of the cross-section varying hollow member for example so as to obtain the cross-section varying hollow member having the shape of the letter U, and then a heating treatment such as quenching or the like of the cross-section varying hollow member is performed. In this case, as the heating method to perform the heat treatment, an energization heating is generally performed. In the energization heating method, an electrode is arranged at each of the two ends of the cross-section varying hollow member having the shape of the letter U, and electric powder is applied between the electrodes so as to heat the entirety of the cross section varying hollow material.

However, since the cross-section varying hollow member has a portion at which cross sectional area varies along the central axis, temperature increase rate greatly differs between a portion having a large cross sectional area (large cross sectional area part) and a portion having a small cross sectional area (small cross sectional area part) in the above method by the energization heating. Therefore, before the temperature of the large cross sectional area part reaches a predetermined temperature for example, the temperature of the small cross sectional area part greatly exceeds the predetermined temperature, and the small cross sectional area part may melt. As a result, it is difficult to heat the entirety of the cross sectional area varying hollow member uniformly until the temperature necessary to perform quenching.

SUMMARY OF THE INVENTION

Therefore, an object of the present invention is to provide a method for production of a stabilizer and a heating device that can facilitate heating the entirety of a hollow member uniformly up to a temperature necessary to perform heating treatment, even in a case in which the hollow member includes a portion at which the cross sectional area varies along the central axis.

In the method for production of stabilizer of the present invention using a hollow member including a part at which cross sectional area varies from a part having a small cross sectional area to a part having a large cross sectional area along the central axis as a starting material, the method includes a heating process in which the hollow member is heated up to the temperature necessary to perform heating treatment by performing an energization heating of the hollow member, a primary heating process and a secondary heating process are performed, in this order, in the heating process, in the primary heating process, the energization heating is performed between primary electrodes arranged at a cross-section varying part of both ends of the part having large cross sectional area, and in the secondary heating process, the energization heating is performed between secondary electrodes arranged at both ends of the hollow member.

In the method for production of the stabilizer of the present invention, since energization heating is performed between the primary electrodes arranged at the cross section varying parts at both ends of the parts having large cross sectional area in the primary heating process, heating of the part having large cross section between the primary electrodes can be performed. Then, by performing energization heating between the secondary electrode arranged at both ends of the hollow member in the secondary heating process, the entirety of the hollow member between the secondary electrodes can be heated.

Here, in the primary heating process before the secondary heating process, since heating is performed on the part having large cross sectional area, which is difficult to increase the temperature thereof compared to the part having small cross sectional area, the part having large cross sectional area and the part having small cross sectional area can be prevented from having temperature differences between them in the hollow member after the secondary heating process. Furthermore, in the secondary heating process, the temperature of the part having small cross sectional area can be prevented from greatly exceeding a predetermined temperature before the part having large cross sectional area reaches the predetermined temperature, and therefore, the part having small cross sectional area can be prevented from melting. As a result, the entirety of the hollow member can be uniformly heated up to the temperature necessary for heat treatment.

Various kinds of structures can be employed in the method for production of the stabilizer of the present invention. For example, in the primary heating process, it is desirable that the energization heating be performed at a part at which the cross sectional area ratio with respect to the part having a large cross sectional area in the cross section varying part is 90% or more. Therefore, in the primary heating process, it is desirable that the electrodes arranged at the cross section varying part be arranged apart from interface part of the part having large cross sectional area and the cross section varying part, and that a position along an axis direction of the contacting portion between the electrode and the cross section varying part of the side of part having a large cross sectional area be aligned to a position along an axial direction at which the cross sectional area ratio with respect to the part having a large cross sectional area in the cross section varying part is 90%, or alternatively, is aligned at a position closer to the side of the part having a small cross sectional area than the position at which the cross sectional area ratio is 90%.

In the primary heating process, the temperature of the part having a large cross sectional area of the hollow member can be set to be 350 to 400° C. The amount of carbon contained in the hollow member can be set to be 0.2 to 0.3 wt % by weight ratio, and temperature of the hollow member can be set to be 1100° C. during the secondary heating process.

In a case in which outer circumferential part of the cross section varying part is formed to have a tapered shape, an inner circumferential part of the primary electrode, which is arranged on the outer circumferential part of the cross section varying part, can be formed to have a tapered shape that corresponds to the tapered shape of the cross section varying part.

The part having a large cross sectional area can be set to have a uniform cross sectional area that is the same along the entirety thereof, and a part having a small cross sectional area can be set to have a uniform cross sectional area that is the same along the entirety thereof. In the primary heating process, temperature of the part having a large cross sectional area of the hollow member can be set to temperature Th indicated by a following Formula 1.

$$Th = \frac{(C \times Tr + D) \times \left(\frac{A2}{A1}\right) \times \left(\frac{L1}{L2}\right) - D}{C}$$ Formula 1

It should be noted that C×Tr+D is electric resistivity ρ (μΩmm), C and D are constants, and Tr is room temperature. A1 is the cross sectional area of the part having small cross sectional area (mm²), L1 is the sum of lengths of the parts having small cross sectional area along central axis direction (mm), A2 is the cross sectional area of the part having a large cross sectional area (mm²), and L2 is the sum of lengths of the parts having a large cross sectional area along central axis direction (mm).

A heating device of the present invention is used for production of stabilizers. That is, the heating device of the present invention is a heating device used for production of a stabilizer in which a hollow member having a cross section varying part in which cross sectional area varies from a part having a small cross sectional area to a part having a large cross sectional area along the central axis is used as starting material, the heating device includes primary electrodes that are fixed on the cross section varying parts at both end parts of the parts having large cross sectional area, and secondary electrodes that are fixed at both ends of the hollow member, wherein energization is performed between the primary electrodes so as to heat the parts having large cross sectional area, and energization is performed between the secondary electrodes so as to heat the entirety of the hollow member.

The heating device of the present invention can yield an effect similar to that in the production of the stabilizer of the present invention.

Various kinds of structures can be employed in the heating device of the present invention. For example, the following structure can be employed, that is, in the case in which energization is performed between the primary electrodes, the primary electrodes arranged at the cross section varying part are arranged apart from an interface part of the part having a large cross sectional area and the cross section varying part, and a position along axis direction of the contacting portion between the primary electrode and the cross section varying part of the side of part having large cross sectional area is aligned to a position along the axial direction at which a cross sectional area ratio with respect to the part having a large cross sectional area in the cross section varying part is 90%, or alternatively, is aligned to a position closer to the side of the part having a small cross sectional area than the position at which the cross sectional area ratio is 90%.

According to the method for production of the stabilizer and the heating device of the present invention, even in the case in which a hollow member having a part at which the cross sectional area varies along the central axis (cross section varying hollow member) is used as a starting material, it will be easy for the entirety of the hollow member to be uniformly heated up to a temperature necessary for heat treatment.

EXPLANATION OF REFERENCE NUMERALS

100: Stabilizer, 100A: cross section varying hollow material (hollow material), 111, 111A: torsion part (part having small cross sectional area, small cross sectional area part), 112, 112A: arm part (part having small cross sectional area, small cross sectional area part), 113, 113A: shoulder part (part having large cross sectional area, large cross sectional area part), 114, 114A, 115, 115A: cross section varying part (taper part), 200: heating device, 211A, 211B: preliminary heating electrode (primary electrode), 212: entire heating electrode (secondary electrode)

THE BEST MODE FOR CARRYING OUT THE INVENTION (1) Structure of Stabilizer

Figure 2:
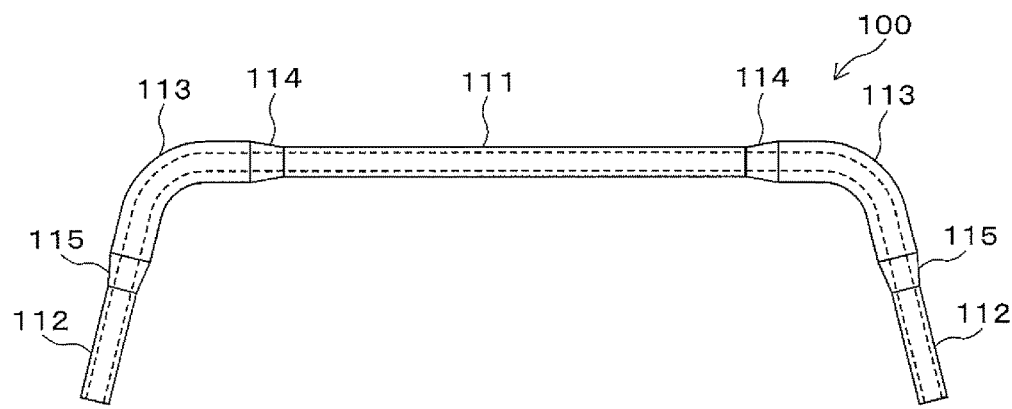
FIG. 2 is a diagram showing a structure of a stabilizer according to an Embodiment of the present invention.

Hereinafter, one Embodiment of the present invention is explained with reference to the drawings. For example, a stabilizer 100 shown in FIG. 2 is a hollow stabilizer having approximately the shape of the letter U including a torsion part 111, arm parts 112, and shoulder parts 113. The torsion part 111 and the shoulder part 113 are connected by a cross section varying part 114, and the arm part 112 and the shoulder part 113 are connected by a cross sectional varying part 115.

Figure 1:
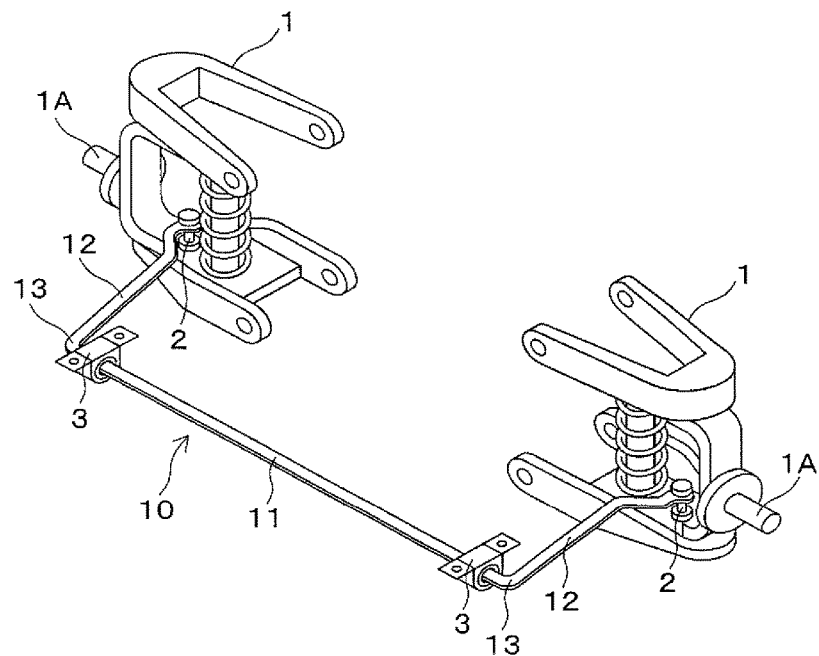
FIG. 1 is a perspective view showing a structure of a stabilizer connected to a suspension device of a car.

In the stabilizer 100, the inner diameter is set constant, and the outer diameter is set so that it varies depending on location. It should be noted that the dotted line in FIG. 2 indicates an inner circumferential surface. The torsion part 111 and the arm parts 112 have a primary outer diameter, the shoulder parts 113 have a secondary outer diameter, and the secondary outer diameter is set to be larger than the primary outer diameter. In this way, the torsion part 111 and the arm parts 112 have a primary cross sectional area, the shoulder parts 113 have a secondary cross sectional area, and the secondary cross sectional area is set to be larger than the primary cross sectional area. In a case in which the stabilizer 100 is connected to a suspension device 1 shown in FIG. 1 and strokes due to up and down motion of the suspension device 1 are imparted, principal stress is generated in the stabilizer 100 due to the load. Since the maximal principal stress may be generated at the shoulder parts 113, the secondary cross sectional area of the shoulder parts 113 is set to be larger than the primary cross sectional area of the torsion part 111 and the arm parts 112.

In the cross section varying parts 114 and 115, the cross sectional area varies along the central axis. For example, the cross section varying part 114 has a tapered shape in which the cross sectional area is increased from the torsion part 111 side to the shoulder part 113 side. For example, the cross section varying part 115 has a tapered shape in which the cross sectional area is increased from the arm part 112 side to the shoulder part 113 side.

It should be noted that the stabilizer is constructed to have parts having two different cross sectional areas (the part having the primary cross sectional area and the part having the secondary cross sectional area) other than the cross section varying parts in this Embodiment; however, the present invention is not limited only to this, and the stabilizer can be constructed to have parts having three or more different cross sectional areas (the part having the primary cross sectional area, the part having the secondary cross sectional area, and part having cross sectional area of number N (N is natural number of 3 or more)) other than the cross section varying parts.

(2) Method for Production of Stabilizer

The method for production of the stabilizer 100 is explained. The stabilizer 100 is produced by performing a process for forming the cross section varying hollow member, a process for bending processing, and a heat treatment process in this order, for example. In the present Embodiment, the heat treatment process which is the main process (in particular, energization heating) is explained in detail, and explanation of the other processes are simplified.

In the process for forming the cross section varying hollow member, for example, a hollow pipe is prepared, in which cross section of the axis direction of the inner circumferential part and the outer circumferential part is formed in a linear shape. Then, by processing one of the inner circumferential part and the outer circumferential part of the hollow pipe, for example, the cross section varying hollow member having a portion at which the cross sectional area varies along the central axis can be obtained. In this Embodiment, by performing a cutting processing or a swage processing at the outer circumferential part, for example, the outer diameter of the hollow pipe varies. In this case, the inner diameter is maintained constant, for example. It should be noted that the inner circumferential part can be processed instead of the outer circumferential part being processed. For example, by performing a drawing processing, the inner diameter of the hollow pipe is changed. In this case, the outer diameter is maintained constant, for example.

The cross section varying hollow member has a portion at which cross sectional area varies along the central axis, so that the cross sectional area varies from a part having a small cross sectional area to a part having a large cross sectional area. In the cross section varying hollow member of the present Embodiment, for example, the part having a small cross sectional area is the small cross sectional part having the primary cross sectional area (portion corresponding to the torsion part 111 and the arm part 112). The part having a large cross sectional area is the large cross sectional part having the secondary cross sectional area (portion corresponding to the shoulder part 113).

The part in which the cross sectional area varies is formed between the small cross sectional area part and the large cross sectional area part, and is the cross section varying part (portion corresponding to the cross section varying parts 114 and 115) of which the cross sectional area increases from the small cross sectional area part side to the large cross sectional area part side. One end (at the small cross sectional area part side) part of the cross section varying part (at the interface part of the cross section varying part and the small cross sectional area part) has the primary cross sectional area that is the same as the small cross sectional area part. The other end (at the large cross sectional area part side) part of the cross section varying part (at the interface part of the cross section varying part and the large cross sectional area part) has the secondary cross sectional area that is the same as the large cross sectional area part. The outer circumferential part of the cross section varying part has a taper shape for example.

At the bending processing process, the bending processing of the cross section varying hollow member is performed. By this process, the cross section varying hollow member 100A can be obtained, which has the torsion part 111A, the arm parts 112A, the shoulder parts 113A, and the cross section varying parts 114A and 115A, and which is approximately shaped like the letter U.

In the heat treatment process, the cross section varying hollow member 100A is heated by energization heating so as to reach a temperature necessary for quenching, for example, and then, the cross section varying hollow member 100 is rapidly cooled to perform quenching. Then, the stabilizer 100 having the torsion part 111, the arm parts 112, and the shoulder parts 113 is formed by performing several kinds of processes, if necessary.

(3) Energization Heating (A) Heating Device

Figure 3:
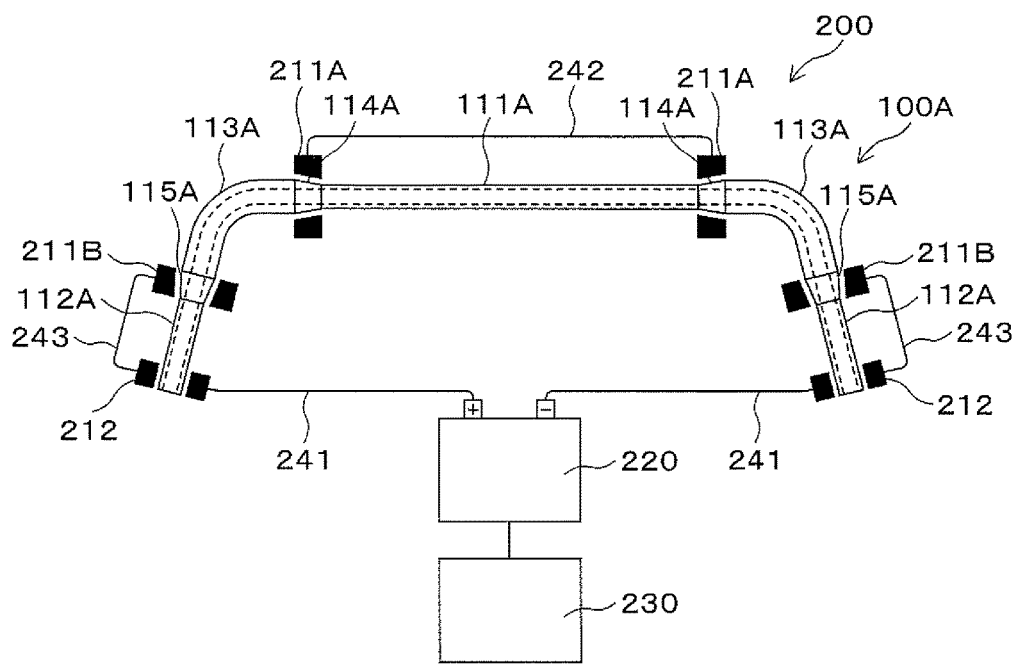
FIG. 3 is a diagram showing an outline structure of the heating device according to an Embodiment of the present invention, and showing a situation in which the cross section varying hollow member, which is a starting material of the stabilizer, is arranged on the heating device.

In the heating process by the above energization heating in the present Embodiment, a preliminary heating process (primary heating process) and the entire heating process (secondary heating process) are performed in this order by using a heating device 200 shown in FIG. 3, for example.

The heating device 200 includes preliminary heating electrodes 211A and 211B (primary electrode), entire heating electrodes 212 (secondary electrode), power source part 220, and controlling part 230. The preliminary heating electrodes 211A and 211B are clamped at the cross section varying parts 114A and 115A, for example, and they are the electrodes for performing energization heating of the shoulder parts 113A. The entire heating electrodes 212 are clamped at both ends of the cross section varying hollow member 100A, for example, and they are the electrodes for performing energization heating of the entirety of the cross section varying hollow member.

To maintain electric current that is necessary for energization heating, it is necessary that the inner circumferential part of the preliminary heating electrodes 211A and 211B be in good contact with respect to the outer circumferential part of the cross section varying parts 114A and 115A. In this case, since the outer circumferential part of the cross section varying pats 114A and 115A have a tapered shape, it is desirable that the inner circumferential part of the preliminary heating electrodes 211A and 211B have a tapered shape so as to fit the tapered shape of the outer circumferential part of the cross section varying parts 114A and 115A. In this Embodiment, since the preliminary heating electrodes 211A and 211B can contact sufficiently with respect to the cross section varying parts 114A and 115A, electric current that is necessary for the energization heating can be sufficiently maintained.

It is desirable that the length of contact of electrodes 211A, 211B and 212 with respect to the corresponding portions in a cross section along the axis direction be set to be 10 mm or more. According to this Embodiment, electric current can be maintained and sparking can be avoided during the energization heating.

Since a hollow member such as a hollow pipe or a butted pipe formed by swage processing is used as the cross section varying hollow member 100A, the tapered shapes of the cross section varying parts 114A and 115A are limited depending on what kind of processing method is selected. Therefore, it is necessary that the cross section varying parts 114A and 115A be made so that it is possible for them to be processed so as to restrain stress concentration as much as possible, and that shape sag part at the end parts of the cross section varying parts 114A and 115A are prevented from contacting the electrodes so as to enable clamping the electrode securely. To realize these matters, it is desirable that the length of the tapering of the cross section varying parts 114A and 115A in a cross section along axis direction be set to be 13 mm or more.

The power source part 220 is a transformer power source, for example, and is controlled by the controlling part 230. Leading wire for energization 241 is connected between the power source part 220 and the electrodes 212, leading wire for short circuit 242 is connected between the electrodes 211A for short circuiting therebetween, and leading wire for short circuit 243 is connected between the electrodes 211B and 212 for short circuiting therebetween.

A heating method using the heating device 200 is explained. First, the preliminary heating electrodes 211A are clamped on the cross section varying parts 114A, the preliminary heating electrodes 211B are clamped on the cross section varying part 115A, and the entire heating electrodes 212 are clamped on both end parts of the cross section varying hollow member 100A. Then, energization between the electrodes 212 is started to perform a preliminary heating process. In this case, since the preliminary heating electrodes 211A and 211B are clamped on the cross section varying parts 114A and 115A, electric current flows in the lead wires for short circuits 242 and 243.

In this way, energization is performed only between the preliminary heating electrodes 211A and 211B at the cross section varying parts 114A and 115A in the cross section varying hollow member 100A, and therefore only the shoulder parts 113A, which are the large cross sectional area part, are heated. In this case, the torsion part 111A and arm parts 112A, which are the small cross sectional area part, are not heated. Furthermore, in the energization heating, since a portion in which the electrode is fixed is not heated, the portion in which the electrodes 211A and 211B are clamped in the cross section varying parts 114A and 115A are not heated either.

It should be noted that since heat is conducted from the heated shoulder parts 113A to peripheral area during a period after finishing the preliminary heating process and before quenching, heating of the portion at which the electrodes 211A and 211B are clamped in the cross section varying parts 114A and 115A is increased. Therefore, by appropriately setting the period after finishing the preliminary heating process and before quenching, the temperature of the portion that is clamped as mentioned above can be freely set.

Subsequently, after the shoulder parts 113A reach a predetermined temperature, the preliminary heating electrodes 211A and 211B are released from the cross section varying parts 114A and 115A, and energizing between both end parts of the cross section varying hollow member 100A so as to perform the entire heating process. In this case, energization is performed in the entirety of the cross section varying hollow member 100A, and the entirety of the cross section varying hollow member is heated. The entire heating process like this is performed until the entirety of the cross section varying hollow member 100A reaches a predetermined temperature.

(B) Heating Temperature

In the preliminary heating process, the energization heating is performed until the temperature of the cross section varying parts 114A and 115A, which are the large area parts, reaches temperature Th shown by the following Formula 1. The temperature Th (° C.) is set from 350 to 400° C. for example.

$$Th = \frac{(C \times Tr + D) \times \left(\frac{A2}{A1}\right) \times \left(\frac{L1}{L2}\right) - D}{C} \quad \text{Formula 1}$$

It should be noted that C×Tr+D is an electric resistivity ρ (μΩmm), C, D are constants, and Tr is room temperature (° C.). A1 is a cross sectional area (mm$^2$) of the torsion part 111A and the arm part 112A which are the small cross sectional area part, L1 is the sum of lengths along the central axis direction (mm) of the torsion part 111A and the arm parts 112A of left and right which are the small cross sectional area part, A2 is a cross sectional area (mm$^2$) of the shoulder part 113A, which is the large cross sectional area part, L2 is the sum of lengths along the central axis direction (mm) of the shoulder parts 113A of left and right which are the large cross sectional area part.

In the entire heating process, the energization heating is performed until the entirety of the cross section varying hollow member 110A reaches 1100° C. In a case in which the carbon amount contained in a material used as the cross section varying hollow member 100A is 0.2 to 0.3 wt % in weight ratio, an ideal value of a predetermined temperature necessary for heat treatment (that is, AC3 (transformation point) changing from ferrite to austenite) is about 830° C. Since it is necessary to consider crystal particle diameter after cooling and heat treatment, which are performed after the energization heating and until quenching at an actual production site, the target heating temperature is set at 1100° C., for example.

(C) Heating Portion

Figure 4:
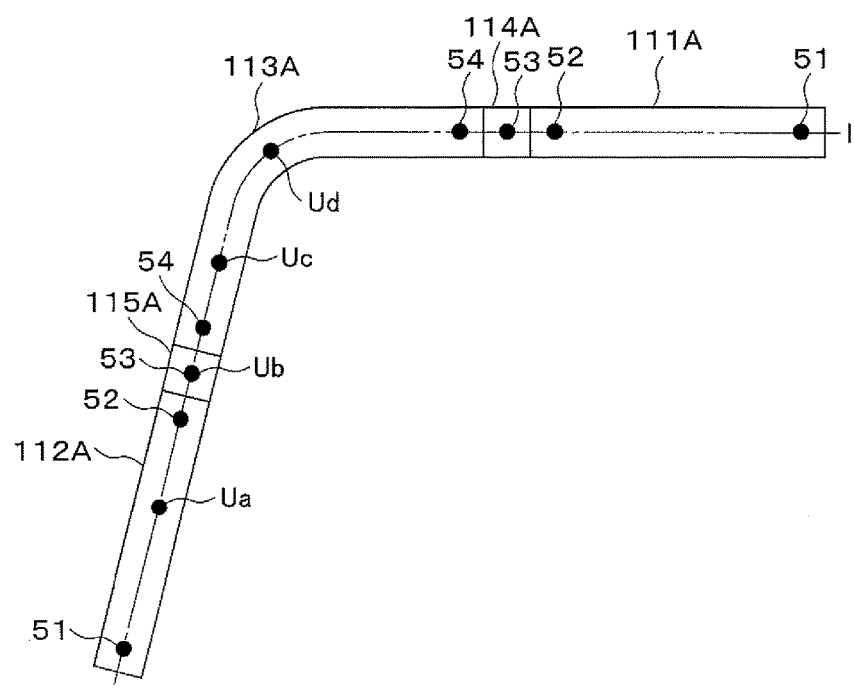
FIG. 4 is a diagram showing heating location in the cross section varying hollow member, which is a starting material of the stabilizer, according to an Embodiment of the present invention.

In the preliminary heating process, selection of fixing position of the preliminary heating electrodes is important. FIG. 4 is a diagram explaining the heating portion in the cross section varying hollow member. It should be noted that in FIG. 4, dashed-dotted line 1 indicates the central line of the cross section varying hollow member 100A, and reference numerals 51 to 54 indicate the center of a portion in which the electrode is arranged. In FIG. 4, for the sake of convenience of illustration, the outer diameters of the entire portions are shown the same. The portion in which the electrode is fixed is not heated by the energization heating.

In a case in which energization is performed between the preliminary heating electrodes while the preliminary heating electrode is fixed at an end part of the cross section varying parts 114A and 115A side (for example, at positions indicated by two reference numerals 54) in the shoulder part 113A, which is the large cross sectional area part of the cross section varying hollow member 100A, since the parts with two reference numerals 54 and the cross section varying parts 114A and 115A of the shoulder part 113A side (side of the large cross sectional area) are not preliminarily heated, these parts that are not preliminarily heated cannot reach a predetermined temperature necessary for the heating treatment during the entire heating process performed thereafter. As a result, material strength that is necessary after the heat treatment may not be maintained.

In a case in which energization is performed between the preliminary heating electrodes while the preliminary heating electrode is fixed at an end part of the cross section varying parts 114A and 115A side (for example, at positions indicated by two reference numerals 52) in the torsion part 111A and the arm part 112A, which are the small cross sectional area parts of the cross section varying hollow member 100A, the cross section varying parts 114A and 115A of the torsion part 111A side (side of the small cross sectional area part) and of the arm part 112A side (side of the small cross sectional area part) are excessively heated, and in the entire heating process performed thereafter, these parts that are excessively heated may melt.

In order to avoid the above problems, in the preliminary heating process, it is important that the preliminary heating electrode be fixed at the cross section varying parts 114A and 115A, for example (at a position indicated by two reference numerals 53 for example) and energization is performed between the preliminary heating electrodes so as to heat the shoulder parts 113A which are the large cross sectional area part.

This is explained with reference to Examples. Reference characters Ua to Ud indicate positions at which temperature is measured in FIG. 4. With respect to all the samples, a left half part of the cross section varying hollow member was used, as shown in FIG. 4.

In Comparative Example 11, the preliminary heating process was not performed, and only the entire heating process was performed by energizing between the entire heating electrodes that are clamped at positions 51 and 51 at both end parts of the cross section varying hollow member. In Comparative Example 12, the preliminary heating process was performed by energizing between the preliminary electrodes that are clamped at positions 52 and 52 of the small cross sectional area parts (the torsion part 111A and the arm part 112A), and the entire heating process was performed by energizing between the entire heating electrodes that are clamped at positions 51 and 51 at both end parts of the cross section varying hollow member.

In Comparative Example 13, the preliminary heating process was performed by energizing between the preliminary electrodes that are clamped at positions 54 and 54 of the large cross sectional area parts (the shoulder part 113A) of the cross section varying hollow member, and the entire heating process was performed by energizing between the entire heating electrodes that are clamped at positions 51 and 51 at both end parts of the cross section varying hollow member. In Example 11 of the present invention, the preliminary heating process was performed by energizing between the preliminary electrodes that are clamped at positions 53 and 53 of the tapered part (the cross section varying parts 114A and 115A) of the cross section varying hollow member, and the entire heating process was performed by energizing between the entire heating electrodes that are clamped at positions 51 and 51 at both end parts of the cross section varying hollow member.

In Comparative Example 11 in which the preliminary heating process was not performed, temperature was measured at the start of the entire heating and at the end of the entire heating. In Comparative Examples 12 and 13 and Example 11, temperature was measured at the start and the end of the preliminary heating, and at the start and the end of the entire heating. The results are shown in FIGS. 5 to 8.

Figure 5:
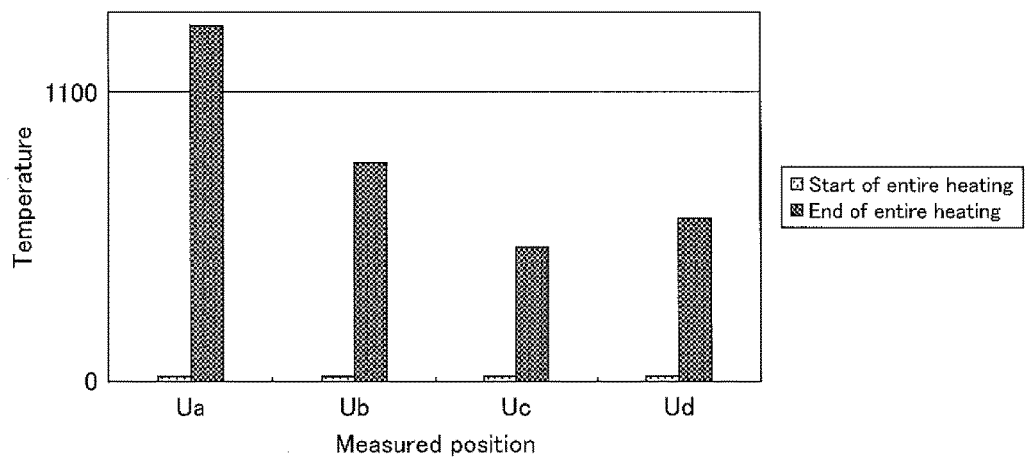
FIG. 5 is a graph showing results of temperature measuring of Comparative Example 11, which is a case in which preliminary heating process is not performed in an Example.

In Comparative Example 11 in which the preliminary heating process was not performed, the position Ua in the small cross sectional area part 112A greatly exceeded the predetermined temperature 1100° C. that is necessary for the heat treatment, as shown in FIG. 5. However, the other parts (the position Ub of the tapered part 115A and the positions Uc and Ud of the large cross sectional area part 113A) were greatly lower than 1100° C. which is insufficient heating. In this way, uniform heating of the cross section varying hollow member could not be performed in Comparative Example 11.

Figure 6:
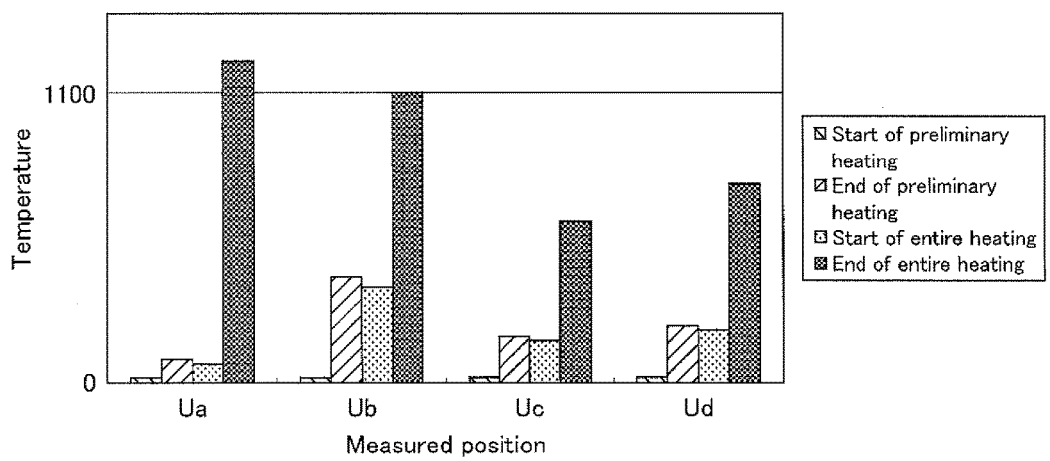
FIG. 6 is a graph showing results of temperature measuring of Comparative Example 12, which is a case in which electrodes are clamped on the small cross sectional area part in the preliminary heating process of an Example.

In Comparative Example 12 in which the preliminary heating electrodes were clamped at positions 52 and 52 in the small cross sectional area part, the position Ua of the small cross sectional area part 112A and the position Ub of the tapered part 115A reached 1100° C., as shown in FIG. 6. However, the positions Uc and Ud of the large cross sectional area part 113A were much lower than 1100° C., which is insufficient heating. In this way, uniform heating of the cross section varying hollow member could not be performed in Comparative Example 12.

Figure 7:
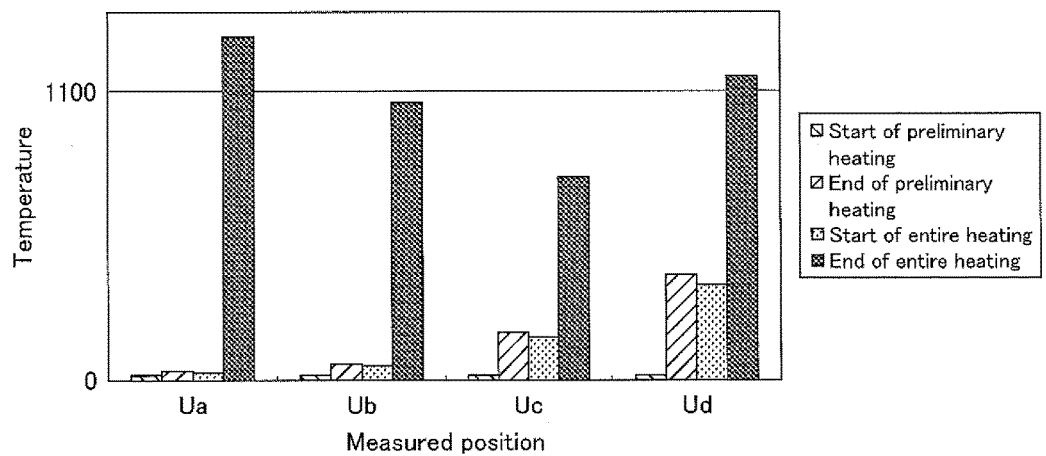
FIG. 7 is a graph showing results of temperature measuring of Comparative Example 13, which is a case in which electrodes are clamped on the large cross sectional area part in the preliminary heating process of an Example.

In Comparative Example 13 in which the preliminary heating electrodes were clamped at positions 54 and 54 in the large cross sectional area part, the position Ua of the small cross sectional area part 112A and the position Ud (the central part) of the large cross sectional area part 113A reached 1100° C. and the position Ub of the taper part 115A reached about 1100° C. as shown in FIG. 7. However, the position Uc of the large cross sectional area part 113A which was close to the preliminary heating electrode (the taper part side) was much lower than 1100° C., which is insufficient heating. In this way, uniform heating of the cross section varying hollow member could not be performed in Comparative Example 13.

Figure 8:
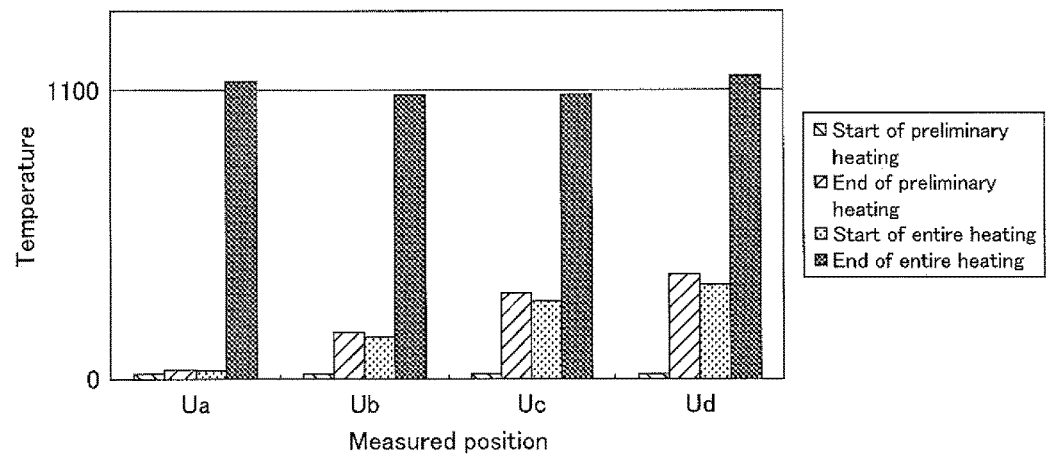
FIG. 8 is a graph showing results of temperature measuring of Example 11, which is a case in which electrodes are clamped on the cross sectional area varying part in the preliminary heating process of an Example.

In Example 11 in which the preliminary heating electrodes were clamped at positions 53 and 53 in the tapered parts, the position Ua of the small cross sectional area part 112A and the position Ud (the central part) of the large cross sectional area part 113A reached 1100° C. and the position Ub of the tapered part 115A and the position Uc of the large cross sectional area part 113A (the tapered part side) reached about 1100° C., as shown in FIG. 8. In this way, heating of the cross section varying hollow member could be performed almost uniformly in Example 11.

As mentioned so far, in the preliminary heating process of this Embodiment, it is important that the preliminary heating electrodes 211A and 211B be fixed on the cross section varying parts 114A and 115A which are the tapered parts, for example (at positions 53 and 53, for example), and energization is performed between the preliminary heating electrodes 211A and 211B so as to heat the shoulder part 113A, which is the large cross sectional area part.

Figure 9:
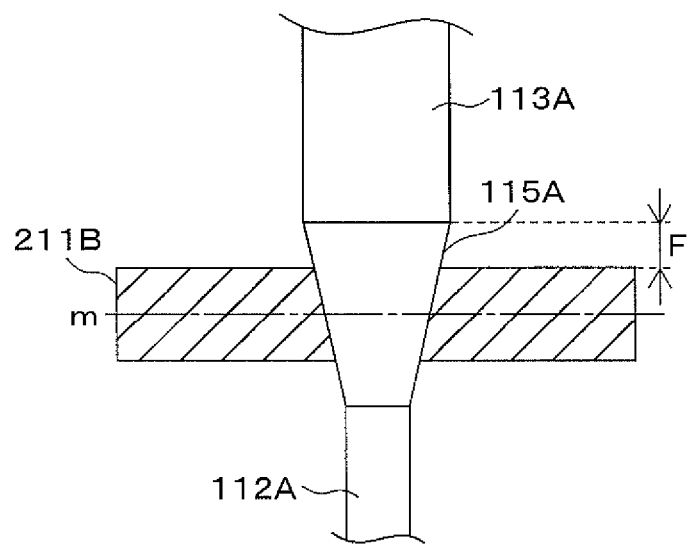
FIG. 9 is a diagram showing a desirable heating location in the cross section varying part of the cross section varying hollow member, which is a starting material of the stabilizer according to an Embodiment of the present invention.

In the present Embodiment, in the case in which the preliminary heating electrodes 211A and 211B are fixed on the cross section varying parts 114A and 115A, it is desirable that the preliminary heating electrodes 211A and 211B be arranged apart from the interface part between the shoulder part 113A that is the large cross sectional area part and the cross section varying parts 114A and 115A. In this case, as shown in FIG. 9 for example, in a case in which a distance along the axis direction between the interface (of the shoulder part 113A and the tapered part 115A) and the shoulder part 113A side (the large cross sectional area part side) of contacting portion of the electrode 211B (211A) and the cross section varying part 115A (114A) is defined as F (mm), the distance along the axis direction F is desirably set as follows.

The position along the axis direction of the shoulder part 113A side (the large cross sectional area side) of the contacting portion of the preliminary heating electrode 211A and the cross sectional varying part 114A, is aligned so that the cross sectional area ratio of the cross section varying part at the position with respect to the shoulder part 113A (the large cross sectional area part) is 90%. Alternatively, it is aligned so as to be closer to the torsion part 111A side (the small cross sectional area side) than the location at which the cross sectional area ratio is 90%. The position along the axis direction of the shoulder part 113A side (the large cross sectional area side) of the contacting portion of the preliminary heating electrode 211B and the cross sectional varying part 115A, is aligned so that cross sectional area ratio of the cross section varying part at the position with respect to the shoulder part 113A (the large cross sectional area part) is 90%. Alternatively, it is aligned so as to be closer to the arm part 112A side (the small cross sectional area side) than the position in which the cross sectional area ratio is 90%. In this way, the position along axis direction of the shoulder part 113A side (the large cross sectional area side) of the contacting portion of the preliminary heating electrodes 211A and 211B and the cross section varying parts 114A and 115A is settled, and the distance along the axis direction F is determined.

In the case in which the preliminary heating electrodes 211A and 211B are fixed to the cross section varying parts 114A and 115A, if the preliminary heating electrodes 211A and 211B are suppositionally contacted to the shoulder part 113A side (the large cross sectional area part side) of the cross section varying parts 114A and 115A, the contacted part is not heated by energization during the preliminary heating process. In this case, heat is conducted from the heated shoulder part 113A to the peripheral area after the end of the preliminary heating process and until quenching; however, it may be insufficient to increase temperature. On the other hand, in the present Embodiment, since the shoulder part 113A side (the large cross sectional area side) of the cross section varying parts 114A and 115A can be heated by energization, the part of the large cross sectional area part side can be sufficiently heated during the preliminary heating process.

The central part of the preliminary heating electrodes 211A and 211B along the central axis direction and the central part of the cross section varying parts 114A and 115A along the central axis direction can be aligned, if necessary, or not aligned, if not necessary. It should be noted that the dashed dotted line m in FIG. 9 indicates the central line along the axis direction of the cross section varying part 115A.

As explained so far, in the present Embodiment, since the shoulder part 113A (the large cross sectional area part), in which it is difficult to increase temperature compared to the torsion part 111A and the arm part 112A (the small cross sectional area part), is heated in the preliminary heating process before the entire heating process, the cross section varying hollow member 100A after the entire heating process can be prevented from generating temperature differences between the large cross sectional area part 113A and the small cross sectional area parts 111A and 112A. In addition, in the entire heating process, the temperature of the small cross sectional area parts 111A and 112A can be prevented from greatly exceeding a predetermined temperature before the large cross sectional area part 113A reaches the predetermined temperature, and therefore, the small cross sectional area parts 111A and 112A can be prevented from melting. As a result, the entirety of the cross section varying hollow member 100A can be uniformly heated until a temperature necessary for heat treatment is reached. Therefore, heating treatment of the cross section varying hollow member 100 can be appropriately performed.

In particular, with respect to the fixing position of the preliminary heating electrodes 211A and 211B to the cross section varying parts 114A and 115A, by setting the distance along axis direction F as mentioned above, the entirety of the hollow member can be more uniformly heated until a temperature necessary for heat treatment is reached.

In addition, since the inner circumferential part of the preliminary heating electrodes 211A and 211B is formed as a tapered shape so as to correspond the tapered shaper of the outer circumferential part of the cross section varying parts 114A and 115A, the preliminary heating electrode 211A and 211B can be sufficiently fitted on the cross section varying parts 114A and 115A. As a result, electric current that is necessary for energization heating can be sufficiently maintained.

The invention claimed is:

1. A method for producing a stabilizer using a hollow member including a part at which a cross sectional area varies along a central axis from a part having a small cross sectional area to a part having a large cross sectional area as a starting material, the method comprising:
a heating process in which the hollow member is heated up to a temperature necessary to perform heat treatment by performing an energization heating of the hollow member, the heating process comprising:
a primary heating process in which energization heating is performed between primary electrodes arranged at a cross-section varying part of both ends of the part having the large cross sectional area; and
a secondary heating process performed after the primary heating process, in which energization heating is performed between secondary electrodes arranged at both ends of the hollow member,
wherein in the primary heating process, the electrodes arranged at the cross section varying part are arranged apart from an interface part of the part having the large cross sectional area and the cross section varying part, and
a position along an axis direction of the contacting portion between the electrode and the cross section varying part of a side of the part having the large cross sectional area is aligned to a position along the axis direction at which a cross sectional area ratio with respect to the part having the large cross sectional area in the cross section varying part is 90%, and alternatively, is aligned to a position closer to a side of the part having a small cross sectional area than the position at which the cross sectional area ratio is 90%.

2. The method for producing a stabilizer according to claim 1, wherein in the primary heating process, a temperature of the part having the large cross sectional area of the hollow member is set to be 350 to 400° C.

3. The method for producing a stabilizer according to claim 1, wherein an amount of carbon contained in the hollow member is set to be 0.2 to 0.3 wt % by weight ratio, and
a temperature of the hollow member is set to be 1100° C. during the secondary heating process.

4. The method for producing a stabilizer according to claim 1, wherein in a case in which an outer circumferential part of the cross section varying part is formed in a tapered shape, an inner circumferential part of the primary electrode which is arranged on the outer circumferential part of the cross section varying part is formed in a tapered shape that corresponds to the tapered shape of the cross section varying part.

5. A method for producing a stabilizer using a hollow member including a part at which a cross sectional area varies along a central axis from a part having a small cross sectional area to a part having a large cross sectional area as a starting material, the method comprising:
a heating process in which the hollow member is heated up to a temperature necessary to perform heat treatment by performing an energization heating of the hollow member, the heating process comprising:
a primary heating process in which energization heating is performed between primary electrodes arranged at a cross-section varying part of both ends of the part having the large cross sectional area; and
a secondary heating process performed after the primary heating process, in which energization heating is performed between secondary electrodes arranged at both ends of the hollow member,
wherein the part having the large cross sectional area is set to have a uniform cross sectional area that is the same along the entirety thereof, and the part having small cross sectional area is set to have a uniform cross sectional area that is the same along the entirety thereof,
wherein in the primary heating process, a temperature of the part having the large cross sectional area of the hollow member is set as temperature Th indicated by Formula 1:

$$Th = \frac{(C \times Tr + D) \times \left(\frac{A2}{A1}\right) \times \left(\frac{L1}{L2}\right) - D}{C}$$

in which C×Tr+D is electric resistivity ρ (μΩmm), C and D are constants, and Tr is room temperature, A1 is the cross sectional area of the part having the small cross sectional area in mm², L1 is a sum of lengths of the parts having small cross sectional area along a central axis direction in mm, A2 is the cross sectional area of the part having a large cross sectional area in mm², L2 is a sum of lengths of the parts having a large cross sectional area along the central axis direction in mm.

* * * * *